G. J. MEYER.
UNLOADER FOR BOTTLE WASHERS.
APPLICATION FILED JUNE 9, 1919.

1,383,739.

Patented July 5, 1921.

WITNESSES
H. D. Chase
C. L. Waal

INVENTOR
George J. Meyer
By R. S. Caldwell
ATTORNEY.

UNITED STATES PATENT OFFICE.

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN.

UNLOADER FOR BOTTLE-WASHERS.

1,383,739.	Specification of Letters Patent.	Patented July 5, 1921.

Original application filed November 22, 1915, Serial No. 62,706. Divided and this application filed June 9, 1919. Serial No. 302,882.

*To all whom it may concern:*

Be it known that I, GEORGE J. MEYER, a citizen of the United States, and resident of Milwaukee, in the county of Milwaukee and State of Wisconsin, have invented new and useful Improvements in Unloaders for Bottle-Washers, of which the following is a description, reference being had to the accompanying drawings, which are a part of this specification.

This invention has for its object to provide a bottle washing machine of the type in which the bottle conveyer is given continuous traveling motion, and the washing and brushing mechanism is given a reciprocating travel to coöperate with the bottles successively while the latter are traveling, such type of bottle washer being exemplified by Patent No. 1,095,290 to Daniel Schmid, dated May 5, 1914.

Another object of the invention is to provide such a machine with an electrically lighted inspection discharge chute onto which the washed bottles are deposited from the conveyer chain of bottle carriers.

Another object of the invention is to provide an automatic unloading means for shifting the bottles from the inspection chute onto a conveyer for removing them from the machine.

This application is a continuation and division of, that is contains subject matter taken from, my co-pending application, Serial No. 62,706, filed Nov. 22, 1915, for bottle washing machine.

With the above and other objects in view the invention consists in the unloader for bottle washers as herein claimed and all equivalents.

Figure 1:
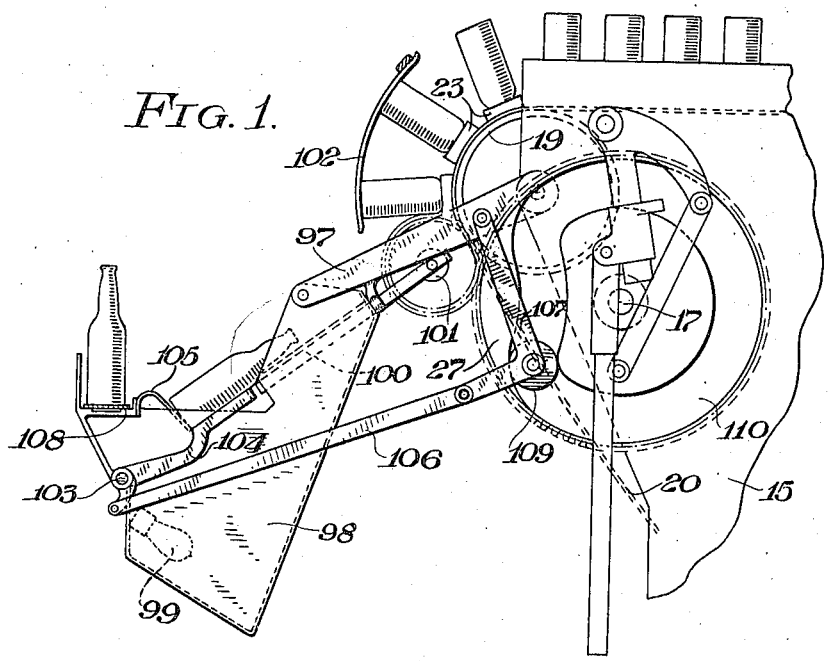
Figure 2:
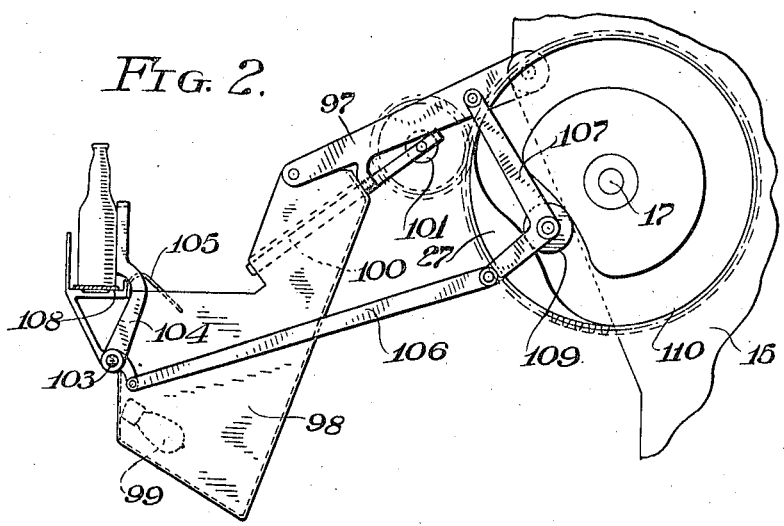

Referring to the accompanying drawings in which like characters of reference indicate the same parts in different views:

Figure 1 is a side view of an unloading mechanism for bottle washing machines constructed in accordance with this invention; and, Fig. 2 is a similar view showing the unloader in its raised position.

In these drawings 15 indicates the frame of a bottle washing machine or the like, only the discharge end thereof being shown. A suitably operated cam shaft 17 is journaled in the frame and sprocket wheels 19 are mounted on a shaft also journaled in the frame and may be geared to cam shaft 17 to give motion to a chain conveyer 20 which passes therearound. This chain conveyer has the links of the chain members thereof connected by wooden cross strips 23 forming bottle carriers having tapering openings to receive the necks of bottles so that the bottles are carried thereby in an inverted position. At this end of the machine is an inspection rest and unloading mechanism into which the bottles are discharged from the bottle carriers 23 as they pass around the sprockets 19. Arms 97 adjustably mounted on the sides of the frame support carry at their ends a sheet metal inspection box 98 which is lighted by electric lamps 99 in the bottom thereof and support stationary inclined guide rods 100 down which the bottles are adapted to slide on leaving the bottle carriers 23. The bottles are assisted in their disengagement from the bottle carriers 23 by the action of a suitably driven discharge roller 101 against which they contact after leaving an adjustable stationary curved bottle discharge guard 102 which is in position to engage the bottoms of the bottles and prevent their falling from the carriers before reaching the roller 101. Journaled across the inspection box 98 is a shaft 103 carrying a frame of parallel arms 104, which at the time the bottles slide down the chute rods 100 are in position to receive them. As shown in Fig. 1 the bottles come to rest by engaging stationary bent spring stop fingers 105. A crank on the shaft 103 is connected by a link 106 with a cam lever 107 which is pivotally mounted on the arm 97. A roller 109 on the cam lever 107 travels in a cam groove 110 of the cam gear 27 and with each cycle of operation of the machine, for each row of bottles on the carrier, causes the shaft 103 to swing upwardly to the position shown in Fig. 2, thereby causing the discharge frame 104 to lift the bottles by sliding them along the curved stop fingers 105 and onto a traveling conveyer belt 108 by means of which they are carried upright to the filling machine.

Before the next row of bottles is ready to be discharged into the inspection box 98 the frame 104 is returned to its position for receiving them, and by the time one row of bottles is ready to be discharged onto the belt conveyer 108 the preceding row has passed out of the way thereof.

The time interval between the falling of the bottles onto the inspection rack formed by the frame 104 and their discharge therefrom is sufficient to permit the attendant to thoroughly inspect each bottle by the aid of the light shining through from beneath so that any bottle that is not perfectly clean may be removed.

What I claim as new and desire to secure by Letters Patent is:

1. In a bottle washing machine having a traveling bottle conveyer, inclined parallel rods forming an inspection chute in position to receive the bottles from the conveyer, the lower part of the inspection chute being pivotally mounted, a stop for limiting the sliding movement of the bottles on the inspection chute, a discharge conveyer, and means for swinging the lower part of the inspection chute for moving the bottles along the stop onto the discharge conveyer.

2. In a bottle washing machine having a traveling bottle conveyer containing bottle carriers adapted to hold inverted bottles by means of the necks thereof, a guide means around which the conveyer travels, and a suitably operated roller engaged by the bottles in their travel around the guide means to withdraw them from the bottle carriers.

3. In a bottle washing machine having a traveling bottle conveyer with bottle carriers containing openings to hold the necks of inverted bottles, a guide means around which the conveyer travels, an arc-shaped guard member in position to prevent the bottles leaving the bottle holders before reaching their discharge position, and a suitably operated roller engaged by the bottles in their discharge position for withdrawing them from the carriers.

4. In a bottle washing machine, a traveling bottle conveyer having bottle carriers with openings in which the necks of inverted bottles fit, a guide means around which the conveyer travels downwardly, an inclined chute in the path of the bottles as they turn around the guide means to conduct them away from the bottle carriers in an inclined position with their necks uppermost, a stop at the end of the chute against which the bottles come to rest, a bottle support, and means for sliding the bottles over the stop and onto the bottle support.

5. In a bottle washing machine, a bottle conveyer having bottle carriers adapted to hold inverted bottles by means of their necks, guide means around which the conveyer passes downwardly, an inclined chute in the path of the bottles as they pass around the guide means and adapted to conduct them away from the conveyer, a suitably driven roller at the upper end of the chute against which the bottles bear, the turning of the roller serving to draw the bottles out of the carriers and onto the chute, a stop against which the bottles come to rest in an inclined position with their necks uppermost, a bottle support, and means for sliding the bottles over the stop and onto the bottle support.

6. In a bottle washing machine a bottle conveyer having bottle carriers for holding bottles in an inverted position by means of their necks, guide means around which the conveyer passes downwardly, an arc-shaped guard member in position to bear on the bottoms of the bottles after the bottles pass around the guide means beyond a horizontal position, an inclined chute in the path of the bottles and adapted to be engaged thereby after the bottles pass beyond the guard member to conduct the bottles from the conveyer in an inclined position with their necks uppermost, a stop against which the bottles come to rest, a bottle rest, and a suitably operated swinging frame to slide the bottles over the stop and onto the bottle rest.

7. In a bottle washing machine a traveling bottle conveyer having bottle carriers adapted to hold inverted bottles by means of their necks, guide means around which the conveyer travels downwardly, an inclined chute in the path of the bottles as they travel around the guide means and adapted to conduct the bottles from the conveyer in an inclined position with their necks uppermost, a stop against which the bottles come to rest in such inclined position, an inspection box surrounding the bottles as they rest on the chute against the stop, means within the inspection box for showing a light through the bottles, and means for moving the bottles out of the inspection box.

8. In a bottle washing machine a traveling conveyer having bottle carriers adapted to hold inverted bottles by means of the necks thereof, guide means around which the conveyer travels downwardly, an inclined slatted chute in the path of the bottles as they travel around the guide means and adapted to conduct the bottles away from the conveyer in an inclined position with their necks uppermost, a stop against which the bottles come to rest in this position, a discharge frame forming an extension of the chute at the lower end thereof and on which the bottles rest when they engage the stop, a discharge conveyer, and means for swinging the discharge frame to slide the bottles over the stop and onto the discharge conveyer.

9. In a bottle washing machine a traveling bottle conveyer having bottle carriers adapted to hold inverted bottles by means of their necks, guide means around which the conveyer passes downwardly, an arc-shaped guard member in position to bear on the bottoms of the bottles as they pass around the guide means beyond a horizontal position, an inclined slatted chute in the path of the bottles and adapted to be engaged thereby after the bottles pass beyond the guard member, a suitably driven roller at the upper end of the chute against which the bottles bear and by its motion serving to withdraw the bottles from the bottle carriers and start them down the chute, a stop against which the bottles come to rest in an inclined position with their necks uppermost, a swinging discharge frame forming an extension of the chute at the lower end thereof and on which the bottles rest when engaging the stop, an inspection box surrounding the bottles in the position in which they rest on the discharge frame and the stop, means within the inspection box for throwing a light through the bottles from beneath, a discharge conveyer, and means for swinging the discharge frame for causing it to slide the bottles over the stop and onto the discharge conveyer.

In testimony whereof, I affix my signature, in presence of two witnesses.

GEORGE J. MEYER.

Witnesses:
R. S. C. CALDWELL,
H. D. CHASE.